United States Patent
Xiao et al.

(10) Patent No.: US 11,829,553 B2
(45) Date of Patent: Nov. 28, 2023

(54) DISPLAY APPARATUS AND METHOD OF POWERING THE SAME

(71) Applicants: Beijing BOE Optoelectronics Technology Co., Ltd., Beijing (CN); BOE Technology Group Co., Ltd., Beijing (CN)

(72) Inventors: Pin Xiao, Beijing (CN); Xiuyun Chen, Beijing (CN); Zongze He, Beijing (CN); Zhenguo Xu, Beijing (CN); Yehao Zhang, Beijing (CN); Yadong Huang, Beijing (CN); Jing Zhao, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/279,716

(22) PCT Filed: Aug. 28, 2020

(86) PCT No.: PCT/CN2020/112207
§ 371 (c)(1),
(2) Date: Mar. 25, 2021

(87) PCT Pub. No.: WO2021/063141
PCT Pub. Date: Apr. 8, 2021

(65) Prior Publication Data
US 2022/0066612 A1    Mar. 3, 2022

(30) Foreign Application Priority Data

Sep. 30, 2019  (CN) .......................... 201910948773.5

(51) Int. Cl.
*G06F 3/041* (2006.01)
*G09G 3/20* (2006.01)

(52) U.S. Cl.
CPC .......... *G06F 3/04166* (2019.05); *G09G 3/20* (2013.01); *G09G 2330/021* (2013.01)

(58) Field of Classification Search
CPC ............ G06F 3/04166; G06F 3/04184; G06F 1/32–3296; G06F 3/0412;
(Continued)

(56) References Cited

U.S. PATENT DOCUMENTS

| | | |
|---|---|---|
| 9,423,907 B2 | 8/2016 | Lee et al. |
| 9,696,883 B2 | 7/2017 | Oh et al. |
| 10,656,741 B2 | 5/2020 | Park et al. |
| 10,936,117 B2 | 3/2021 | Wang et al. |
| 11,009,985 B2 | 5/2021 | Park et al. |
| 2011/0022867 A1 | 1/2011 | Chang et al. |

(Continued)

FOREIGN PATENT DOCUMENTS

| | | |
|---|---|---|
| CN | 103914173 A | 7/2014 |
| CN | 106055156 A | 10/2016 |

(Continued)

OTHER PUBLICATIONS

Extended European Search Report dated Nov. 2, 2022, for corresponding European Application No. 20864305.6, 7 pages.

*Primary Examiner* — Roberto W Flores
*Assistant Examiner* — Aaron Midkiff
(74) *Attorney, Agent, or Firm* — Westman, Champlin & Koehler, P.A.

(57) ABSTRACT

A display apparatus and a method of powering the display apparatus are provided. The display apparatus includes: a main control circuit, configured to provide a first control signal; a touch display driving circuit, configured to provide a second control signal; a power supply circuit, coupled to the touch display driving circuit, and configured to provide a power supply voltage to the touch display driving circuit; and a logic circuit coupled to the main control circuit, the (Continued)

touch display driving circuit, and the power supply circuit, and configured to continuously enable the power supply circuit in a first mode and intermittently enable the power supply circuit in a second mode, under a control of the first control signal and the second control signal.

13 Claims, 5 Drawing Sheets

(58) Field of Classification Search
CPC .......... G06F 3/041–04897; G06F 1/26; G06F 1/3243; G06F 1/3262; G06F 1/3231–3265; G06F 3/04164; G06F 3/00–167; G06F 3/0416–041662; G06F 21/81; G09G 3/20; G09G 2330/021; G09G 2330/02–028; G09G 2330/00–12; G09G 5/00–008; G09G 2290/00; G09G 2310/06–068; G09G 1/005; G09G 2230/00; G09G 2330/027
See application file for complete search history.

(56) References Cited

U.S. PATENT DOCUMENTS

| | | |
|---|---|---|
| 2014/0184534 A1 | 7/2014 | Lee et al. |
| 2015/0268778 A1 | 9/2015 | Okamura |
| 2016/0188142 A1 | 6/2016 | Oh et al. |
| 2018/0113549 A1 | 4/2018 | Park et al. |
| 2018/0164946 A1* | 6/2018 | Noguchi ............... G06F 3/0445 |
| 2019/0332241 A1 | 10/2019 | Wang et al. |
| 2020/0233518 A1 | 7/2020 | Park et al. |
| 2021/0232252 A1 | 7/2021 | Park et al. |
| 2021/0389839 A1* | 12/2021 | Kwak ................... G06F 1/1684 |

FOREIGN PATENT DOCUMENTS

| | | | |
|---|---|---|---|
| CN | 106201047 A | 12/2016 | |
| CN | 107122081 A | 9/2017 | |
| CN | 107977107 A | 5/2018 | |
| KR | 20190007773 A | 1/2019 | |
| KR | 10-2019-0029029 A | 3/2019 | |
| KR | 20200101264 A * | 8/2020 | ............... G06F 3/01 |

* cited by examiner

DISPLAY APPARATUS AND METHOD OF POWERING THE SAME

CROSS-REFERENCE TO RELATED APPLICATION(S)

This application is a Section 371 National Stage Application of International Application No. PCT/CN2020/112207, filed on Aug. 28, 2020, entitled "DISPLAY APPARATUS AND METHOD OF POWERING THE SAME", which claims priority to the Chinese Patent Application No. 201910948773.5, filed on Sep. 30, 2019, the disclosure of which are incorporated herein by reference in their entireties.

TECHNICAL FIELD

The present disclosure relates to a field of display technology, and in particular to a display apparatus and method of powering the same.

BACKGROUND

In the existing technologies, for a display apparatus, such as a display apparatus with a touch function, a panel is driven to perform operations such as display and touch by a driving circuit. In recent years, TDDI (Touch and Display Driver Integration) technology has received more and more attention due to its high performance and small size. TDDI technology refers to an integration of a driving circuit for touch control and a driving circuit for display.

SUMMARY

In a first aspect, a display apparatus is provided, including: a main control circuit, configured to provide a first control signal; a touch display driving circuit, configured to provide a second control signal; a power supply circuit, coupled to the touch display driving circuit, and configured to provide a power supply voltage to the touch display driving circuit; and a logic circuit, coupled to the main control circuit, the touch display driving circuit, and the power supply circuit, and configured to continuously enable the power supply circuit in a first mode and intermittently enable the power supply circuit in a second mode, under a control of the first control signal and the second control signal.

In some embodiments, the main control circuit is configured to provide a first control signal at a first level in the first mode, and provide a first control signal at a second level in the second mode; and the touch display driving circuit is configured to provide a second control signal at a third level in the first mode, and periodically provide a second control signal at a fourth level in the second mode.

In some embodiments, the logic circuit includes an OR gate, wherein a first input end of the OR gate is coupled to the main control circuit to receive the first control signal, a second input end of the OR gate is coupled to the touch display driving circuit to receive the second control signal, and an output end of the OR gate is coupled to an enable end of the power supply circuit.

In some embodiments, the touch display driving circuit is coupled to the main control circuit, the touch display driving circuit is further configured to perform touch detection in the second mode by using the power supply voltage provided by the power supply circuit, and the main control circuit is further configured to switch the display apparatus from the second mode to the first mode based on a result of the touch detection performed by the touch display driving circuit.

In some embodiments, the result of the touch detection indicates whether a preset touch action has occurred.

In some embodiments, the display apparatus further comprises: an auxiliary circuit, coupled to the touch display driving circuit, and configured to provide to the touch display driving circuit an auxiliary voltage lower than the supply voltage, wherein the touch display driving circuit is further configured to generate the second control signal by using the auxiliary voltage.

In some embodiments, the touch display driving circuit includes a general-purpose input/output (GPIO) interface, and the touch display driving circuit is coupled to the logic circuit via the general input/output (GPIO) interface.

In some embodiments, the touch display driving circuit is a touch and display driver integration (TDDI) circuit.

In some embodiments, the first mode is an active mode, and the second mode is an idle mode.

In some embodiments, each of the first level and the fourth level is a high level, and each of the second level and the third level is a low level.

In a second aspect, a method of powering a display apparatus mentioned above, including: in a first mode, providing a first control signal by a main control circuit, providing a second control signal by a touch display driving circuit, and continuously enabling a power supply circuit to provide a power supply voltage to the touch display driving circuit, by a logic circuit based on the first control signal and the second control signal; and in a second mode, providing a first control signal by the main control circuit, providing a second control signal by the touch display driving circuit, and intermittently enabling the power supply circuit to provide a power supply voltage to the touch display driving circuit, by the logic circuit based on the first control signal and the second control signal.

In some embodiments, the logic circuit includes an OR gate, wherein in the first mode, providing a first control signal at a first level by the main control circuit, and providing a second control signal at a third level by the touch display driving circuit, so that the logic circuit continuously enables the power supply circuit to provide the power supply voltage to the touch display driving circuit; and wherein in the second mode, providing a first control signal at a second level by the main control circuit, and periodically providing a second control signal at a fourth level by the touch display driving circuit, so that the logic circuit periodically enables the power supply circuit to provide the power supply voltage to the touch display driving circuit.

In some embodiments, the periodically providing a second control signal at a fourth level comprises: providing the second control signal at the fourth level in a blanking period of each frame.

In some embodiments, the method further comprises: in the second mode, performing, by the touch display driving circuit, touch detection in the blanking period, and switching, by the main control circuit, the display apparatus from the second mode to the first mode.

In some embodiments, the main control circuit switches the display apparatus from the second mode to the first mode based on whether a preset touch action has occurred.

BRIEF DESCRIPTION OF THE ACCOMPANYING DRAWINGS

DETAILED DESCRIPTION

Figure 1:
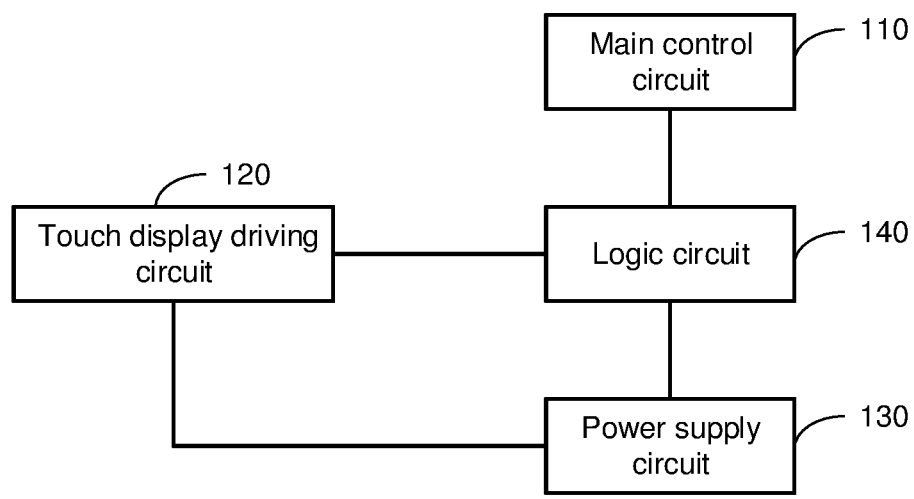
FIG. 1 shows a block diagram of a display apparatus according to some embodiments of the present disclosure.

In order to make the objectives, technical solutions, and advantages of the embodiments of the present disclosure clearer, the technical solutions in the embodiments of the present disclosure may be described clearly and completely in conjunction with the accompanying drawings in the embodiments of the present disclosure. Obviously, the described embodiments are part of the embodiments of the present disclosure, but not all of them. Based on the described embodiments of the present disclosure, all other embodiments obtained by those of ordinary skill in the art without creative labor are within the protection scope of the present disclosure. It should be noted that throughout the drawings, same elements are represented by same or similar reference signs. In the following description, some specific embodiments are only used for descriptive purposes, and should not be construed as limiting the present disclosure, but are merely examples of the embodiments of the present disclosure. When it may cause confusion in the understanding of the present disclosure, conventional structures or configurations may be omitted. It should be noted that the shape and size of each component in the drawings do not reflect the actual size and ratio, but merely illustrate the content of the embodiment of the present disclosure.

Unless otherwise defined, the technical terms or scientific terms used in the embodiments of the present disclosure should have the usual meanings understood by those skilled in the art. The "first", "second" and similar words used in the embodiments of the present disclosure do not denote any order, quantity or importance, but are only used to distinguish different components.

Generally, a display apparatus may be operated in different modes, such as an active mode and an idle mode.

In the active mode, the display apparatus performs display and touch detection. The display and the touch detection may be performed in a time-sharing manner. For example, the display is performed in a display period of a frame, and the touch detection is performed in a blanking period of the frame. During the display, a driving circuit of the display apparatus performs display driving (for example, outputting a display scan signal and a display data signal to a display panel of the display apparatus) to drive corresponding pixels on the display panel to emit light, thereby realizing image display. During the touch detection, the driving circuit performs touch driving (for example, transmitting a touch scan signal to a touch panel of the display apparatus), so that sensing units provided in an array on the touch panel generate sensing signals. For a sensing unit, a sensing signal generated when being touched is different from a sensing signal generated when not being touched, thus a touch may be detected by analyzing the difference.

In the idle mode, the display apparatus may not perform display, but may perform touch detection. Since it is not necessary to continuously perform the touch detection, continuously supplying power to the touch display driving circuit may lead to a waste of power.

According to some embodiments of the present disclosure, a display circuit and a method of powering the display circuit are provided, which may reduce the waste of power.

FIG. 1 shows a block diagram of a display apparatus according to some embodiments of the present disclosure As shown in FIG. 1, a display apparatus 100 includes a main control circuit 110, a touch display driving circuit 120, a power supply circuit 130 and a logic circuit 140. The logic circuit 140 is respectively coupled to the main control circuit 110, the touch display driving circuit 120 and the power supply circuit 130. The power supply circuit 130 is coupled to the touch display driving circuit 120.

The main control circuit 110 may provide a first control signal. The touch display driving circuit 120 may provide a second control signal. The power supply circuit 130 may provide a power supply voltage to the touch display driving circuit 120. The logic circuit 140 may continuously enable the power supply circuit 130 in a first mode and intermittently enable the power supply circuit 130 in a second mode, under a control of the first control signal and the second control signal.

For example, the main control circuit 110 may provide a first control signal at a first level in the first mode and provide a first control signal at a second level in the second mode. The touch display driving circuit 120 may provide a second control signal at a third level in the first mode, and periodically provide a second control signal at a fourth level in the second mode. Therefore, the logic circuit 140 may continuously enable the power supply circuit 130 in the first mode and periodically enable the power supply circuit 130 in the second mode.

In some embodiments, the first mode may be an active mode, and the second mode may be an idle mode. In some embodiments, the first level may be a high level, and the second level may be a low level. In some embodiments, the third level may be a low level, and the fourth level may be a high level. However, the embodiments of the present disclosure are not limited to this. The first level and the second level may be used interchangeably, and the third level and the fourth level may further be used interchangeably. The first level may be same as or different from the fourth level, and the second level may be same as or different from the third level. That is, the high level of the first control signal and the high level of the second control signal may have a same value or may have different values, and the low level of the first control signal and the low level of the second control signal may have a same value or may have different values.

According to the embodiments of the present disclosure, in different modes, a power supply circuit may be continuously or periodically enabled based on control signals generated by a main control circuit and a touch display driving circuit. In this way, instead of continuous power supply, power may be supplied by the power supply circuit as needed, thereby saving power.

Figure 2:
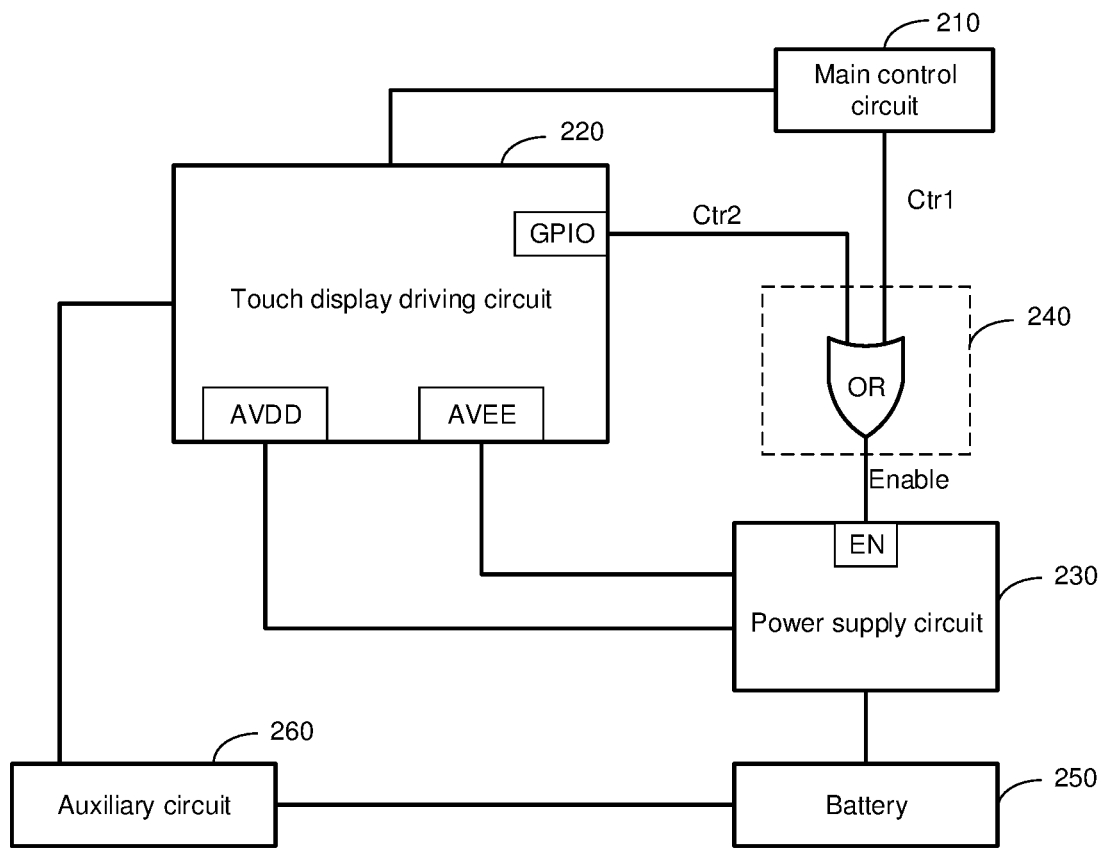
FIG. 2 shows a block diagram of a display apparatus according to some embodiments of the present disclosure.

FIG. 2 shows a block diagram of a display apparatus according to some embodiments of the present disclosure.

As shown in FIG. 2, similar to FIG. 1, the display apparatus 200 includes a main control circuit 210, a touch display driving circuit 220, a power supply circuit 230 and a logic circuit 240. The above description with reference to FIG. 1 is further applicable to the display apparatus 200.

The main control circuit 210 may be a main controller in the display apparatus 200, including but not limited to a CPU, GPU, micro-control unit MCU, etc. The main control circuit 210 may provide a first control signal Ctr1 at a first level in a first mode, and provide a first control signal Ctr1 at a second level in the second mode. For example, the main control circuit 210 may provide a first control signal Ctr1 at a high level in an active mode, and provide a first control signal Ctr1 at a low level in an idle mode. In some embodiments, for example, the main control circuit 210 may output the first control signal Ctr1 from an inherent enable signal output end.

The touch display driving circuit 220 may provide a second control signal Ctr2 at a third level in the first mode, and periodically provide a second control signal Ctr2 at a fourth level in the second mode. For example, in the active mode, the touch display driving circuit 220 may provide a second control signal Ctr2 at a continuous low level. In the idle mode, the touch display driving circuit 220 may provide a second control signal Ctr2 at a high level in a blanking period of each frame, and provide a second control signal Ctr2 at a low level in a display period of said each frame. In some embodiments, the touch display driving circuit 220 may be a TDDI circuit integrating a display driving sub-circuit and a touch driving sub-circuit therein. The touch display driving circuit 220 may include an interface for outputting the second control signal Ctr2 (for example, a GPIO interface in FIG. 2). An existing touch display driving circuit is continuously powered under a control of the main control circuit. In contrast, the touch display driving circuit 220 of the embodiments of the present disclosure may provide a single control signal (i.e., the second control signal) by using the GPIO interface of the TDDI chip. In this way, the touch display driving circuit 220 may enable its own power supply as needed, thereby saving power. The touch display driving circuit 220 may further include power supply ends AVDD and AVEE. The power supply end AVDD may receive a first power supply voltage (for example, a power source voltage), and the power supply end AVEE may receive a second power supply voltage (for example, a reference voltage). The display driving sub-circuit in the touch display driving circuit 220 may perform display driving by using the power source voltage from the power supply end AVDD and the reference voltage from the power supply end AVEE. The touch driving sub-circuit in the touch display driving circuit 220 may perform touch detection by using the power source voltage from the power supply end AVDD.

The power supply circuit 230 is coupled to the touch display driving circuit 220 and may provide a power supply voltage to the touch display driving circuit 220. For example, the power supply circuit 230 may include an enable signal end EN. If the signal at the enable signal end EN is a valid enable signal, the power supply circuit 230 generates a power supply voltage (for example, generating an power source voltage and a reference voltage, and supplying the voltages to the power supply ends AVDD and AVEE of the touch display driving circuit 220 respectively). In some embodiments, amplitude of the power supply voltage may range from 4.5 V to 6.5 V. For example, a power supply voltage in a range of −5 V to +5 V may be provided.

The logic circuit 240 may generate an enable signal Enable for the power supply circuit 230 according to the first control signal Ctr1 and the second control signal Ctr2. For example, as shown in FIG. 2, the logic circuit 240 may include an OR gate. A first input end of the OR gate is coupled to the main control circuit 210 to receive the first control signal Ctr1. A second input end of the OR gate is coupled to the touch display driving circuit 220 (for example, coupled to a GPIO interface thereof) to receive the second control signal Ctr2. An output end of the OR gate is coupled to an enable end EN of the power supply circuit 230 to provide an enable signal Enable for the power supply circuit 230. For example, in the first mode, the first control signal Ctr1 and the second control signal Ctr2 cause the OR gate to generate an enable signal Enable at a continuous high level, so that the power supply circuit 230 continuously provides the power supply voltage to the touch display driving circuit 220. In the second mode, the first control signal Ctr1 and the second control signal Ctr2 cause the OR gate to generate an enable signal Enable at a periodic high level, so that the power supply circuit 230 periodically provides the power supply voltage to the touch display driving circuit 220. In some embodiments, the logic circuit 240 may include an interface for receiving the second control signal Ctr2, such as a general-purpose input and output GPIO interface, so as to be coupled to the general-purpose input/output of the touch display driving circuit 220 via the general-purpose input/output GPIO interface.

In some embodiments, as shown in FIG. 2, the touch display driving circuit 220 may be coupled to the main control circuit 210. The touch display driving circuit 220 may further perform touch detection in the second mode by using the power supply voltage provided by the power supply circuit 230. The main control circuit 210 may further switch the display apparatus 200 from the second mode to the first mode based on touch detection result. For example, in the blanking period of each frame in the idle mode, the touch driving sub-circuit in the touch display driving circuit 220 may perform touch detection by using the power supply voltage provided by the power supply circuit 230 in the blanking period, such that touch detection result is generated. The touch detection result may include, but is not limited to, touch detection data and an analysis result obtained based on the touch detection data. As an example, the touch display driving circuit 220 may transmit touch detection data (for example, data related to a touch on the touch panel) to the main control circuit 210. The main control circuit 210 determines whether a wake-up event (for example, a touch, slide or predetermined gesture) has occurred according to the touch detection data. If a wake-up event has occurred, the main control circuit 210 may switch the display apparatus 200 to the active mode, i.e., wake up the display apparatus 200. As another example, the touch display driving circuit 220 may analyze the touch detection data, and transmit the analysis result (for example, whether a touch or specified touch action has occurred) to the main control circuit 210. The main control circuit 210 may wake up the display apparatus 200 according to the analysis result.

In some embodiments, the display circuit 200 may further include a battery 250 for providing the power supply circuit 230 with required power. In some embodiments, the display circuit 200 may further include an auxiliary circuit 260, used to provide an auxiliary voltage (the auxiliary voltage may be lower than the power supply voltage of the power supply circuit 230, for example, the auxiliary voltage may be about 1.8V) for the touch display driving circuit 220 in the second mode. The touch display driving circuit 220 may generate the second control signal by using the lower auxiliary voltage. The auxiliary voltage may further be used in touch detection of the touch display driving circuit 220. The auxiliary circuit 260 may be implemented by other power sources other than the power supply circuit 230 in the display apparatus 200. For example, the display apparatus 200 may provide three power sources for the TDDI circuit. When the display apparatus 200 is in the idle mode, an power source providing a lower voltage keeps working as the auxiliary circuit 260, while an power source providing a higher voltage (for example, the power supply circuit 230) may work as required and may be turned off when not needed.

In the above-mentioned embodiments, an OR gate is used to generate an enable signal for enabling the power supply circuit 230 based on the first control signal and the second control signal, such that saving of power may be achieved by using a logic circuit having a simple structure. However, the embodiments of the present disclosure are not limited to this. The main control circuit 210 and the touch display driving circuit 220 may provide other forms of first control signals and second control signals as required, such that logic circuits 240 having other structures may be selected accordingly. The power supply circuit 230 may be continuously enabled in the first mode, and the power supply circuit 230 may be intermittently enabled in the second mode. For example, the main control circuit 210 may output a first control signal at a high level in both the first mode and the second mode. The touch display driving circuit 220 may provide a second control signal at a low level in the first mode, and periodically provide a second control signal at a high level in the second mode. The logic circuit 240 may include a logic sub-circuit in addition to the OR gate. The logic sub-circuit may be configured to pull down the first control signal to a low level when the display apparatus is switched to the second mode. For example, the logic sub-circuit may pull down the first control signal according to a first rising edge of the second control signal. In this way, it is also possible to continuously enable the power supply circuit 230 in the first mode, and intermittently enable the power supply circuit 230 in the second mode.

Figure 3:
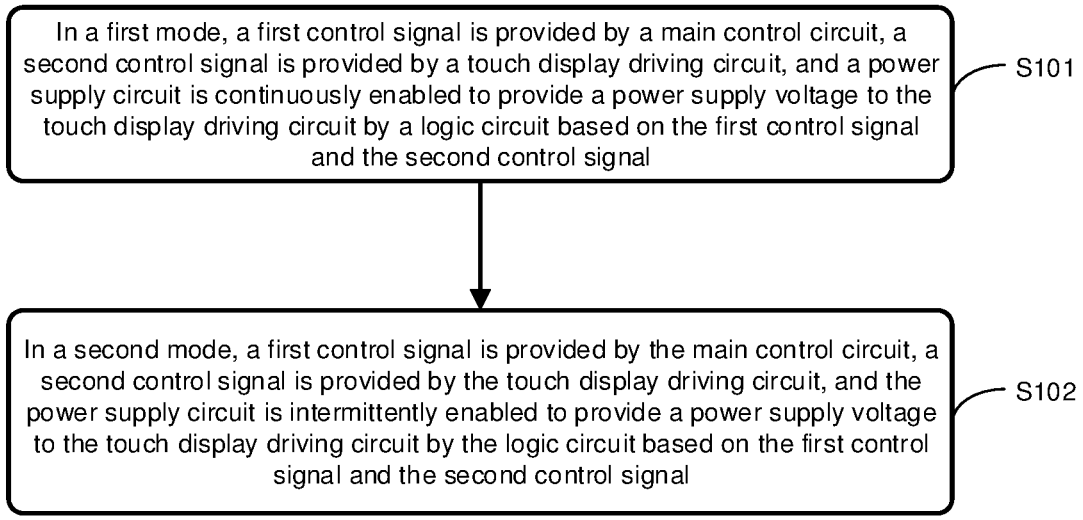
FIG. 3 shows a flowchart of a method of powering a display apparatus according to some embodiments of the present disclosure.

FIG. 3 shows a flowchart of a method of powering a display apparatus according to some embodiments of the present disclosure. The method may be performed in the display apparatus of any of the above embodiments, such as the display apparatus 100 or 200.

In step S101, in a first mode, a first control signal is provided by a main control circuit, a second control signal is provided by a touch display driving circuit, and a power supply circuit is continuously enabled to provide a power supply voltage to the touch display driving circuit by a logic circuit based on the first control signal and the second control signal.

For example, the logic circuit may include an OR gate. The main control circuit may provide a first control signal at a first level, and the touch display driving circuit may provide a second control signal at a third level. Thus, the logic circuit may continuously enable the power supply circuit to provide a power supply voltage to the touch display driving circuit.

In step S102, in a second mode, a first control signal is provided by the main control circuit, a second control signal is provided by the touch display driving circuit, and the power supply circuit is intermittently enabled to provide a power supply voltage to the touch display driving circuit, by the logic circuit based on the first control signal and the second control signal.

For example, the logic circuit may include an OR gate. The main control circuit may provide a first control signal at a second level, and the touch display driving circuit may periodically provide a second control signal at a fourth level (for example, provide a high level in a blanking period of each frame). Thus, the logic circuit may periodically enable the power supply circuit to provide a power supply voltage to the touch display driving circuit.

Figure 4:
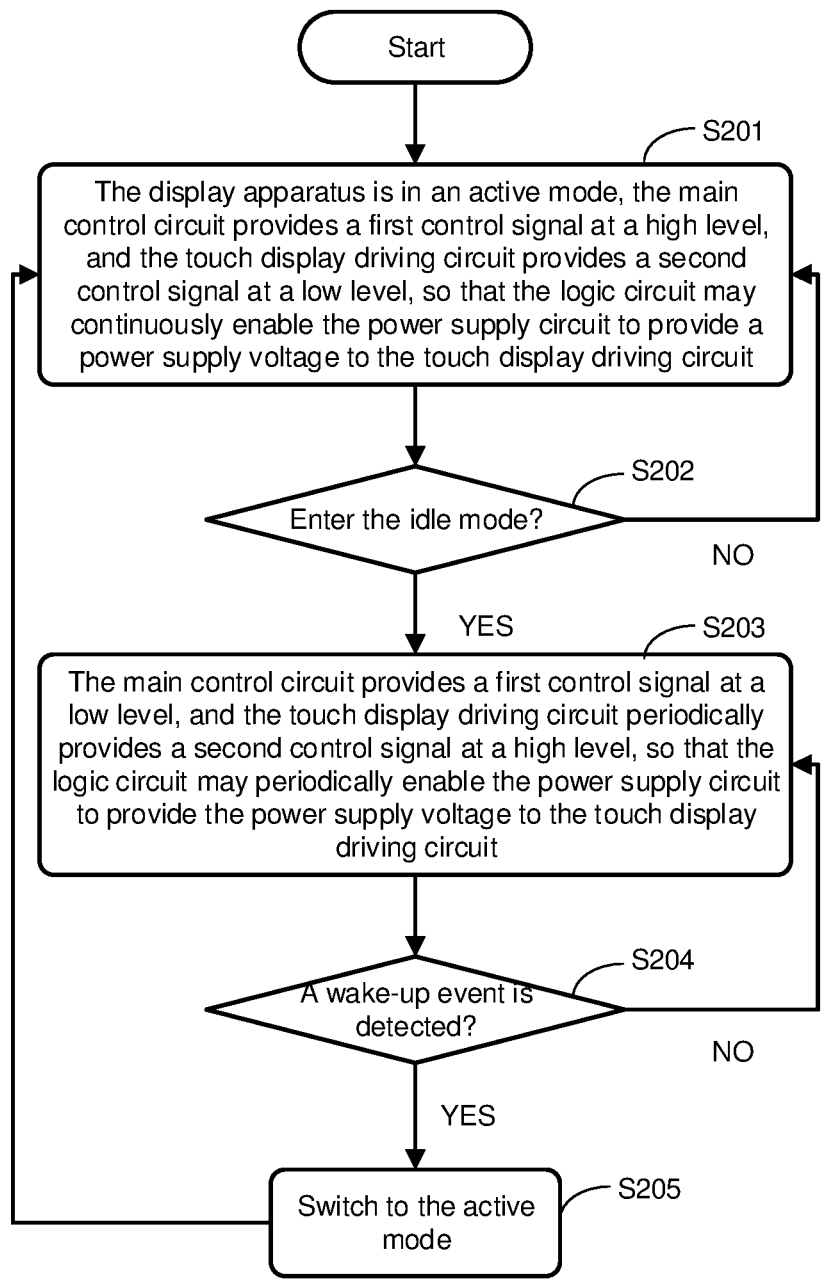
FIG. 4 shows a flowchart of a method of powering a display apparatus according to some embodiments of the present disclosure.

FIG. 4 shows a flowchart of a method of powering a display apparatus according to some embodiments of the present disclosure. The method may be performed in the display apparatus of any of the above embodiments, such as the display apparatus 200. The logic circuit 240 includes an OR gate.

In step S201, the display apparatus is in an active mode, in which the main control circuit provides a first control signal at a high level, and the touch display driving circuit provides a second control signal at a low level, such that the logic circuit may continuously enable the power supply circuit to provide a power supply voltage to the touch display driving circuit.

In step S202, it is determined whether the display apparatus enters the idle mode. If the display apparatus enters the idle mode, step S203 is performed. If the display apparatus doesn't enter the idle mode, step S201 is performed to cause the display apparatus continue operating in the active mode. The step S202 may be performed by the main control circuit. For example, if a user presses a standby button of the display apparatus or performs no operation on the display apparatus within a predetermined period, the main control circuit may switch the display apparatus to the idle mode, otherwise the display apparatus maintains the active mode.

In step S203, the display apparatus is in the idle mode, in which the main control circuit provides a first control signal at a low level, and the touch display driving circuit periodically provides a second control signal at a high level (for example, provides a high level in the blanking period of each frame), such that the logic circuit may periodically enable the power supply circuit to provide the power supply voltage to the touch display driving circuit.

In step S204, it is determined whether a wake-up event is detected. If a wake-up event is detected, step S205 is performed. If a wake-up event is not detected, step S203 is performed to continue operating in the idle mode. During the periodic power supply, touch detection may be performed by the touch display driving circuit based on the supplied power supply voltage. For example, the touch display driving circuit may output a touch scan signal and receive a touch sensing signal. Since the touch sensing signal carries information about a touch (also called touch detection data), a touch may be detected according to the information. In some embodiments, the touch display driving circuit may convert the touch sensing signal into data recognizable by the main control circuit and provide the data for the main control circuit. The main control circuit determines whether a touch or a specific touch action, gesture, etc. has occurred, so that it is determined whether a wake-up event has occurred. For example, it may be determined that a wake-up event has occurred in response to a touch having occurred, or it may be determined that a wake-up event has occurred in response to a specific gesture having occurred. In other embodiments, the touch display driving circuit may further analyze after obtaining the touch sensing signal, and provide a obtained analysis result (for example, whether a touch or a specific touch action or gesture has occurred) for the main control circuit. The control circuit may determine whether a wake-up event has occurred according to the analysis result.

In step S205, the display apparatus is switched to the active mode. The step S205 may be performed by the main control circuit. For example, the main control circuit may switch the display apparatus from the idle mode to the active mode and notify other circuits in the display apparatus (such as the touch display driving circuit, even the logic circuit in some embodiments). In this way, the display apparatus is waked up, thereby step S201 of operating in the active mode is performed.

Figure 5:
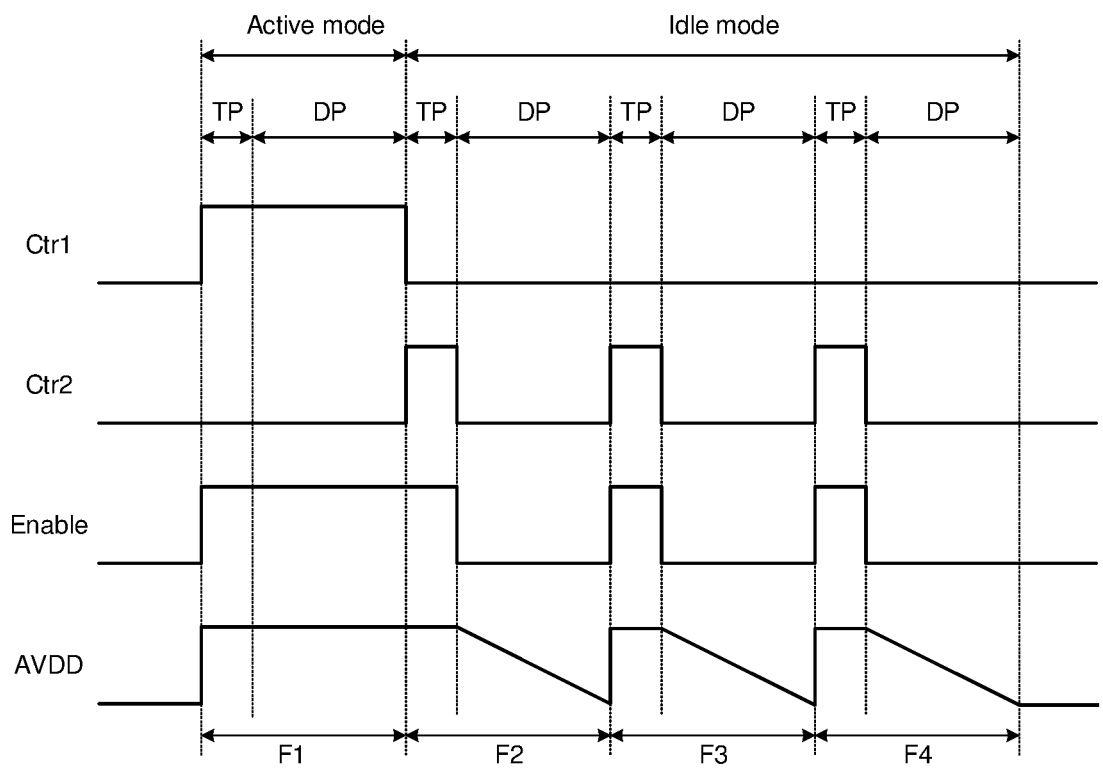
FIG. 5 shows a signal sequence diagram of a display apparatus according to some embodiments of the present disclosure.

FIG. 5 shows a signal sequence diagram of a display apparatus according to some embodiments of the present disclosure. The signal sequence diagram is applicable to the display apparatus of any of the above embodiments, such as the display apparatus 200. The sequence diagram will be described in details below in conjunction with the display apparatus 200.

As shown in FIG. 5, each of the multiple frames F1, F2, F3, F4 . . . includes a blanking period TP and a display period DP. The display apparatus 200 performs touch detection in the blanking period TP and performs display during the display period DP, so as to minimize an impact between the two periods.

In the first frame F1, the display apparatus 200 is operating in the active mode. The first control signal Ctr1 is at a high level, and the second control signal Ctr2 is at a low level. Therefore, the output end of the OR gate outputs a enable signal Enable at a high level. The enable signal Enable at the high level is provided to the enable end EN of the power supply circuit 230, so that the enable power supply circuit 230 is enabled to provide a power supply voltage to the touch display driving circuit 220. For brevity, the power supply voltage at the power supply end AVDD (i.e., the power source voltage) is shown in FIG. 5. The reference voltage at the power supply end AVEE has a similar but inverted waveform, which will not be repeated here. As shown in FIG. 5, the power supply voltage of the power supply end AVDD is always at a high level in the first mode. For example, the power supply voltage may range from 4.5V to 6.5V, such as 5V or so.

In the second frame F2, the display apparatus 200 enters the idle mode.

In the blanking period of the second frame F2, the first control signal Ctr1 is at a low level and the second control signal Ctr2 is at a high level. Therefore, the enable signal Enable output by the OR gate is still at a high level, and the power supply circuit 230 may continue providing the power supply voltage (for example, about 5V) for the power supply end AVDD. During this period, the touch display driving circuit 230 may perform touch detection by using the provided power supply voltage of about 5V. If a wake-up event such as a touch or a specific gesture is detected, the main control circuit 210 wakes up the display apparatus 200 to return to the active mode.

In the display period of the second frame F2, the first control signal Ctr1 and the second control signal Ctr2 are both at a low level, so that the OR gate outputs a enable signal Enable at a low level. The enable signal Enable at the low level disables the power supply circuit 230, so that the voltage of the power supply end AVDD of the touch display driving circuit 220 gradually decreases (also called gradually discharges). During this period, the display apparatus 200 does not need to perform display, so the touch display driving circuit 230 may not be powered.

In the third frame F3, the display apparatus 200 is still in the idle mode.

In the blanking period of the third frame F3, similar to that in the second frame F2, the first control signal Ctr1 is at a low level and the second control signal Ctr2 is at a high level. Therefore, the enable signal Enable is at a high level. The enable signal Enable at the high level is provided to the enable end EN of the power supply circuit 230, so that the power supply circuit 230 is enabled to provide a power supply voltage (for example, a voltage of about 5V at the power supply end AVDD).

In the display period of the third frame F3, similar to that in the second frame F2, the first control signal Ctr1 and the second control signal Ctr2 are both at a low level, so that the enable signal Enable is at a low level. Thus, the power supply voltage at the power supply end AVDD gradually drops.

Operations in the fourth frame F4 is the same as the operations in the third frame F3, and will not be repeated here.

Although the power supply voltage of the power supply end AVDD is gradually discharged in the above embodiments, the embodiments of the present disclosure are not limited to this. In some embodiments, the power supply circuit 230 may be configured to directly jump the power supply voltage from a high level to a low level (for example, from 5V to 0V) when being disabled.

According to the embodiments of the present disclosure, enabling of the power supply circuit may be controlled by both the main control circuit and the touch display driving circuit. In the first mode, the enabling of the power supply circuit may be controlled by the main circuit, so that the power supply circuit may continuously supply power to the touch display driving circuit. In the second mode, the enabling of the power supply circuit may be led by the touch display driving circuit itself, so that the power supply circuit may only supply power to the touch display driving circuit as needed. Compared with continuously supplying power to the power supply circuit in either the active mode or the idle mode, the embodiments of the present disclosure may reduce power consumption of the power supply circuit. In this manner, battery energy consumption may be reduced and idle time of the display apparatus may be prolonged.

In addition, in the embodiments of the present disclosure, the power supply to the touch display driving circuit is enabled in the blanking period of each frame in the second mode. Compared with the display period DP, the blanking period TP is much shorter. Taking a frame length of about 16.7 ms as an example, the length of the blanking period TP is about 4.4 ms. Therefore, it possible to reduce power consumption of the power supply circuit to a large extent. For example, for a display apparatus having an idle power consumption of about 4.3 mW, the method of the embodiments of the present disclosure may reduce the idle power consumption to about 1.07 mW. That is, the power consumption is reduced by 75%. This is advantageous for some display apparatuses that require high power consumption, such as smart wearable products like watches.

Those skilled in the art may understand that the embodiments described above are all exemplary, and can be improved by those skilled in the art. The structures described in the various embodiments can be freely combined without conflicts in structure or principle.

After describing the embodiments of the present disclosure in details, those skilled in the art may clearly understand that various changes and changes may be made without departing from the scope and spirit of the appended claims, and the present disclosure is not limited to the implementation of the exemplary embodiments in the description.

We claim:

1. A display apparatus, comprising:
   a main control circuit, configured to provide a first control signal;
   a touch display driving circuit, configured to provide a second control signal;

a power supply circuit, coupled to the touch display driving circuit, and configured to provide a power supply voltage to the touch display driving circuit; and a logic circuit, coupled to the main control circuit, the touch display driving circuit, and the power supply circuit, and configured to continuously enable the power supply circuit in a first mode and intermittently enable the power supply circuit in a second mode, under a control of the first control signal and the second control signal, wherein the main control circuit is configured to provide a first control signal at a first level in the first mode, and provide a first control signal at a second level in the second mode; and the touch display driving circuit is configured to provide a second control signal at a third level in the first mode, and periodically provide a second control signal at a fourth level in the second mode;

wherein each of the first level and the fourth level is a high level, and each of the second level and the third level is a low level;

wherein the logic circuit comprises an OR gate, wherein a first input end of the OR gate is coupled to the main control circuit to receive the first control signal, a second input end of the OR gate is coupled to the touch display driving circuit to receive the second control signal, and an output end of the OR gate is coupled to an enable end of the power supply circuit; and wherein under the control of the first control signal and the second control signal, the OR gate is configured to: generate an enable signal at a continuous high level in the first mode such that the power supply circuit continuously provides a power supply voltage to the touch display driving circuit, and generate an enable signal at a periodic high level in the second mode such that the power supply circuit periodically provides the power supply voltage to the touch display driving circuit.

2. The display apparatus of claim 1, wherein the touch display driving circuit is coupled to the main control circuit, the touch display driving circuit is further configured to perform touch detection in the second mode by using the power supply voltage provided by the power supply circuit, and the main control circuit is further configured to switch the display apparatus from the second mode to the first mode based on a result of the touch detection result performed by the touch display driving circuit.

3. The display apparatus of claim 2, wherein the result of the touch detection indicates whether a preset touch action has occurred.

4. The display apparatus of claim 2, further comprising: an auxiliary circuit, coupled to the touch display driving circuit, and configured to provide to the touch display driving circuit an auxiliary voltage lower than the supply voltage, wherein the touch display driving circuit is further configured to generate the second control signal by using the auxiliary voltage.

5. The display apparatus of claim 1, wherein the touch display driving circuit comprises a general-purpose input/output (GPIO) interface, and the touch display driving circuit is coupled to the logic circuit via the general input/output (GPIO) interface.

6. The display apparatus of claim 1, wherein the touch display driving circuit is a touch and display driver integration (TDDI) circuit.

7. The display apparatus of claim 1, wherein the first mode is an active mode, and the second mode is an idle mode.

8. A method of powering a display apparatus of claim 1, comprising:

in a first mode, providing a first control signal by a main control circuit, providing a second control signal by a touch display driving circuit, and continuously enabling a power supply circuit to provide a power supply voltage to the touch display driving circuit, by a logic circuit based on the first control signal and the second control signal; and in a second mode, providing a first control signal by the main control circuit, providing a second control signal by the touch display driving circuit, and intermittently enabling the power supply circuit to provide a power supply voltage to the touch display driving circuit, by the logic circuit based on the first control signal and the second control signal.

9. The method of claim 8, wherein the logic circuit comprises an OR gate, wherein in the first mode, providing a first control signal at a first level by the main control circuit, and providing a second control signal at a third level by the touch display driving circuit, so that the logic circuit continuously enables the power supply circuit to provide the power supply voltage to the touch display driving circuit;

and wherein in the second mode, providing a first control signal at a second level by the main control circuit, and periodically providing a second control signal at a fourth level by the touch display driving circuit, so that the logic circuit periodically enables the power supply circuit to provide the power supply voltage to the touch display driving circuit.

10. The method of claim 9, wherein the periodically providing a second control signal at a fourth level comprises: providing the second control signal at the fourth level in a blanking period of each frame.

11. The method of claim 10, further comprising: in the second mode, performing, by the touch display driving circuit, touch detection in the blanking period, and switching, by the main control circuit, the display apparatus from the second mode to the first mode.

12. The method of claim 11, wherein the main control circuit switches the display apparatus from the second mode to the first mode based on whether a preset touch action has occurred.

13. The display apparatus of claim 1, wherein each of the first level and the fourth level is a high level, and each of the second level and the third level is a low level.

* * * * *